Aug. 27, 1935.  G. W. BAUGHMAN  2,012,748
COMBINED ELECTRIC AND FRICTION BRAKE
Filed Nov. 7, 1933
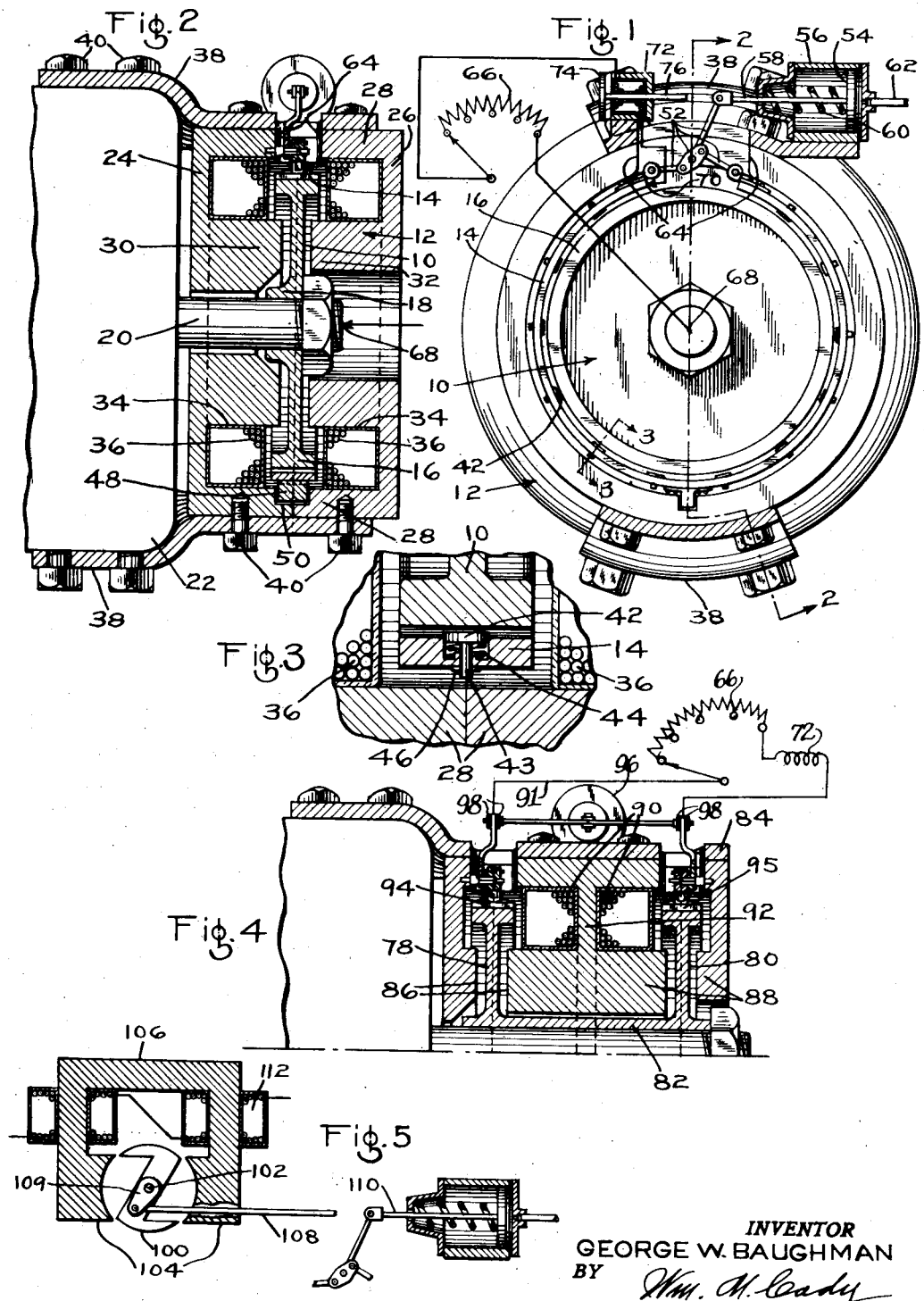
INVENTOR
GEORGE W. BAUGHMAN
BY Wm. M. Cady
ATTORNEY Patented Aug. 27, 1935

2,012,748

UNITED STATES PATENT OFFICE 2,012,748

COMBINED ELECTRIC AND FRICTION BRAKE

George W. Baughman, Edgewood, Pa., assignor to The Westinghouse Air Brake Company, Wilmerding, Pa., a corporation of Pennsylvania Application November 7, 1933, Serial No. 696,982

28 Claims. (Cl. 188—156)

This invention relates to a brake apparatus for vehicles, and in particular to such an apparatus having means for producing both an electro-dynamic and a friction brake effect.

The use of an electro-dynamic brake for braking various kinds of vehicles has become common practice. It is well known, however, that the effectiveness of such a brake decreases as the speed of the vehicle decreases, so that as a consequence a brake of the friction type must be employed at low speeds to bring the vehicle to a stop quickly. Various designs of combined electro-dynamic and friction brakes have been produced, but in so far as it is known none of these has employed the principle of the homo-polar generator to effect electro-dynamic braking. This is perhaps due to the great difficulty generally experienced in conducting current to and from the rotor of the generator, as the brushes or current collectors must press upon the rotor with such force as to produce considerable friction therebetween.

It is a principal object of this invention to provide a brake apparatus adapted to produce both an electro-dynamic and a friction brake effect, in which the elements producing the electro-dynamic brake effect operate on the homo-polar generator principle, and in which friction brake elements cooperate with a rotor member to make the friction of the friction brake parts an active element in establishing and maintaining the electro-dynamic braking effect.

Another object is to provide a brake apparatus of this same general character in which the rotor of the electro-dynamic brake is employed as the brake drum of the friction brake, and the friction brake shoes or bands are utilized as the brushes or current collectors of the electro-dynamic brake.

Yet another object is to provide such a brake apparatus in which the degree of retardation corresponding to one braking effect is controlled in accordance with the degree of retardation corresponding to the other braking effect.

A still further object is to provide a brake apparatus having a stator and a rotor, with which may be produced both an electro-dynamic and a friction brake effect, in which the degree of application of the brake may be controlled by controlling frictional engagement with the rotor, or the current strength in the stator, or the current strength in the rotor, or any combination of these.

Yet further objects will be apparent from the following description, taken in connection with the attached drawing, in which Fig. 1 is an end view of one embodiment, with certain outer parts removed and other parts shown either diagrammatically or in section for the sake of clearness.

Fig. 2 is a view along the line 2—2 of Fig. 1.

Fig. 3 is a view along the line 3—3 of Fig. 1.

Fig. 4 is a partial sectional view of another embodiment, as viewed in the same plane as in Fig. 2.

Fig. 5 is a diagrammatic view of a modified form of the control mechanism shown in the upper part of Fig. 1.

Referring now principally to Figs. 1 to 3 of the drawing, there is shown a rotor 10 and a stator 12, comprising the essential elements of a homo-polar generator and adapted to produce an electro-dynamic brake effect, and a brake band 14 adapted to frictionally engage the periphery of the rotor 10 to produce a friction brake effect and to also serve as a current collector or brush for an external circuit of the rotor.

The rotor 10 is preferably of the disc type having a peripheral flange 16 and a hub portion 18, which is secured to a shaft or other part rotating as the vehicle moves, such for example as the drive shaft 20 of a vehicle motor 22. The rotor is of electrically conductive material which may be either magnetic or non-magnetic.

The stator 12 is provided with two annular magnetic core sections 24 and 26, adapted to be assembled together so as to form a common yoke portion 28 and having specially formed pole pieces 30 and 32, respectively, in adjacent opposing relationship and on either side of the disc portion of the rotor 10, as shown. Each of the core sections 24 and 26 is provided with an annular slot 34 in which are disposed insulated windings 36 for producing a magnetic flux between the pole pieces 30 and 32 when energized. The two halves 24 and 26 of the stator may be held together, and the stator as a whole may be supported from the vehicle motor 22, by brackets 38 and bolts 40.

The brake band 14 is substantially coextensive with the periphery of the rotor 10, and is provided with a plurality of contacting metallic buttons 42 having stems 43 in which are pins 46 for limiting the radial movement of the buttons in recesses in the brake band 14 against tension of springs 44 normally urging the buttons inwardly. The buttons normally project within the inner periphery of the brake band and are forced flush therewith when the band contacts the rotor 10. The brake band may have a guide lug 48 secured thereto and interfitting with a slot 50 in the stator 12 so as to resist turning of the band when frictionally engaging the rotating rotor.

For actuating the brake band 14 into and out of frictional engagement with the rotor 10, there are provided levers and links 52 connecting with a piston 54 of a brake cylinder 56 through a piston rod 58. The brake band 14 is normally held out of engagement with the rotor 10 by action of release spring 60 on piston 54. In this released position the buttons 42 are also out of contact with the rotor 10. Fluid under pressure may be supplied to the brake cylinder 56 by pipe 62 when it is desired to effect engagement of the brake band with the rotor. The stator 12 is cut away, as at 64, to permit the levers and links 52 to be connected to the brake band 14.

For regulating the strength of the current generated in the rotor 10, as will more fully hereinafter appear, there is provided in an exterior circuit a rheostat, shown diagrammatically at 66, having one terminal connected to the drive shaft 20, or other similar part to which the rotor 10 is secured, as at 68, and having its other terminal connected to the brake band 14, as at 70, the brake band acting as a brush or current collector when it or the buttons 42 engage the periphery of the rotor 10.

For controlling the degree of application of the friction brake in accordance with the degree of application of the electro-dynamic brake, of which more will be said later, there is provided an electromagnet 72, connected in series with the rheostat 66 and having an armature member 74 to which is secured a rod 76. The rod 76 is in axial alignment with the piston rod 58 of the brake cylinder 56, so that a movement of the piston 54 to the left, as when applying the friction brake, will cause the piston rod 58 to engage the electromagnet rod 76 when the armature 74 has been attracted to the electromagnet 72, thus limiting the application of the friction brake, as will more fully hereinafter appear.

In operation, when the brakes are held released the parts are in the relative positions shown in Fig. 1. While the vehicle is in motion the rotor 10 is rotating. When it is desired to effect an application of the brakes, fluid under pressure is supplied to the brake cylinder 56 through pipe 62, and simultaneously, winding 36 is energized by the supply of current thereto in any well known manner. A magnetic flux will be immediately established having a path including the yoke portion 28, the pole pieces 30 and 32, and the air gap between the pole pieces 30 and 32, in which the disc portion of the rotor 10 is rotating. Although the rotor 10 will be rotating in a magnetic field substantially no current will be generated therein until an external circuit for the flow of such current is established. This external circuit is established when the buttons 42 contact the periphery of the rotor 10 as the brake band 14 is contracted due to fluid pressure in brake cylinder 56 causing piston 54 to move to the left.

Since the stator pole pieces 30 and 32 are of annular configuration, the flux across the gap therebetween will always be unidirectional and will be normal to a corresponding annular portion of the rotor 10. Therefore, current will be generated in the disc portion of the rotor 10 having a direction of flow radially of the rotor. As soon as the buttons 42 contact the periphery of the rotor 10, thereby completing an external circuit, current flows from the rotor to the external circuit and thence back to the rotor. This current reacts with the flux establishing it to produce a braking effect on the rotor.

If the speed of the vehicle being braked is high enough for the electro-dynamic brake to be effective, sufficient current will flow in the external circuit to energize the electromagnet 72. The electromagnet 72 will attract its armature 74 to the right, thus positioning the rod 76 in its extreme right position. As the piston 54 moves to the left its rod 58 will engage the rod 76. The arrangement of the parts is such that this engagement takes place while the yielding buttons 42 contact the rotor 10, but before the brake band proper has come into frictional engagement with the rotor to produce a friction brake effect. The force of the electromagnet 72, which corresponds to the effective braking force of the electro-dynamic brake, thus opposes the force of the fluid pressure on piston 54, which corresponds to the effective braking force of the friction brake. When the electro-dynamic brake is exerting a braking force greater than that which would be exerted by the friction brake under pressure of the fluid supplied at that time, the electromagnet 72 prevents an application of the friction brake. However, as the speed of the vehicle diminishes and the effective braking force of the electro-dynamic brake diminishes, the force of the electromagnet 72 correspondingly diminishes, and it yields to a greater force exerted by the fluid pressure on piston 54, thus permitting an increasing application of the friction brake as the effectiveness of the electro-dynamic brake decreases. At some point during the deceleration period of the vehicle, corresponding to a low speed, the force exerted by the electromagnet 72 is wholly ineffective in restraining the application of the friction brake and the friction brake is fully applied according to the desired degree. Of course at rest the electro-dynamic brake is ineffective and the friction brake is wholly relied upon.

The strength of current in the rotor 10, and hence the effectiveness of the electro-dynamic braking, may be controlled by the rheostat 66. Varying the strength of the current in the rotor also varies the time, during the deceleration period of a vehicle, at which one brake becomes relatively ineffective and the other becomes more effective.

It will thus be seen that in my improved brake apparatus both an electro-dynamic and a friction brake effect are produced, and that each is produced at a time when it is more effective than the other, although the effects are overlapping at certain times during a changeover period.

Instead of using one rotor I may use two or more rotors, arranged somewhat as is shown in Fig. 4, thus increasing both the friction brake effect and the electro-dynamic brake effect, as well as simplifying the conducting of current to and from the rotors.

As shown in Fig. 4, there are two rotors 78 and 80, each similar to the heretofore described rotor 10, and both preferably having a common hub portion 82.

A stator 84 is provided with duplicate pairs of pole pieces 86 and 88, and duplicate windings 90. The windings 90 are intended to be connected to a suitable source of current supply in a manner such that a magnetic flux is established by one winding across the air gap between pole pieces 86 opposite in direction to another flux established by the other winding across the air gap between pole pieces 88, so that the rotor 78 will have a current generated therein flowing in a radial direction opposite to that generated in rotor 80. The intermediate core portion 92 will then act as a common path for the two fluxes. The brake bands 94 and 95, with their buttons (not shown but same as those heretofore described), will then serve as current collectors or brushes, one band conducting from the rotors to an external circuit 91 and the other band conducting to the rotors from the external circuit. The brake bands 94 and 95 are connected to a brake cylinder 96 by levers and links similar to those heretofore described, but in order to provide for flow of current through the external circuit 91, in which are connected the rheostat 66 and electromagnet 72, for purposes heretofore described, the levers of one brake band are preferably electrically insulated from the levers of the other brake band, as for example by use of insulating tubes and washers 98 at the joints.

While the structural details of the embodiment shown in Fig. 4 are somewhat different, its operation is essentially the same as described in connection with that in Figs. 1 and 2.

Instead of the type of electromagnet 72 illustrated in Fig. 1, I may use a Z-armature type as shown in Fig. 5. This type has a Z-shaped armature 100 rotatable about a pivot 102 between pole pieces 104 of electromagnet 106. A rod 108 is suitably secured to the Z-armature 100, as by a link 109, and is adapted to be positioned to engage the piston rod 110 in the manner and for the purpose hereinbefore described, when the Z-armature is attracted toward the pole pieces 104 upon energization of the electromagnet winding 112. This type electromagnet has an advantage over the type shown in Fig. 1, in that it permits a more gradual change over from electro-dynamic braking to friction braking when the former decreases in effectiveness due to decrease in the speed of the vehicle. It is also possible to taper the air gap between the Z-armature and the pole pieces 104 so as to obtain various torque characteristics of the electromagnet, for the purpose of varying the kind of change-over from electric to friction braking.

While I have described several embodiments of my invention, I also claim such other embodiments as are within the spirit and scope of the appended claims.

Having now described my invention, what I claim as new and desire to secure by Letters Patent, is:

1. In a brake apparatus for vehicles, the combination of an electric brake having a rotor, a friction brake comprising elements adapted to frictionally engage said rotor, means operable when said elements engage said rotor for producing an electric braking effect, and means for restraining the force with which said elements engage said rotor during the production of said electric braking effect.

2. In a vehicle brake apparatus, the combination of an electro-dynamic brake having a rotor, a friction brake comprising an element adapted to engage said rotor, and means operable when said element engages said rotor for restraining the producing of a braking effect of one of said brakes and for subsequently yielding to permit the producing of a braking effect by said restrained brake.

3. In a vehicle brake apparatus, the combination of an electro-dynamic brake having a rotor, a friction brake comprising an element adapted to engage said rotor, and means operable when said element engages said rotor for restraining the producing of a braking effect of one of said brakes when the other of said brakes is more effective and for subsequently yielding to permit producing of a brake effect by said restrained brake when the other brake is less effective.

4. In a vehicle brake apparatus, the combination of an electro-dynamic brake having a rotor and being operable to produce a braking effect which diminishes as the speed of the vehicle diminishes, a friction brake comprising elements adapted to frictionally engage said rotor, and means operable upon an application of said brakes for initially limiting the operation of the friction brake in accordance with the effectiveness of the electric brake and for effecting an increasing application of the friction brake as the effectiveness of the electric brake diminishes.

5. In a vehicle brake apparatus, the combination of an electro-dynamic brake having a rotor and being operable to produce a braking effect which diminishes as the speed of the vehicle diminishes, a friction brake comprising elements adapted to frictionally engage said rotor, means operable upon an operation of said friction brake for effecting a braking action with said electric brake, and means for varying the frictional engagement of said elements with said rotor in accordance with the variations of the braking action of the electric brake.

6. In a vehicle brake apparatus, the combination of an electro-dynamic brake having a rotor and being operable to produce a braking effect which diminishes as the speed of the vehicle diminishes, a friction brake comprising elements adapted to frictionally engage said rotor, means operable when said elements engage said rotor for establishing electric currents in said rotor to effect a braking action of said electric brake, and means governed by said currents for controlling the application of said friction brake.

7. In a vehicle brake, the combination of a stator for producing a magnetic field, a rotor adapted to rotate in said field, a friction brake adapted to engage said rotor, means rendered effective when making an application of said friction brake for altering the electrical condition of said rotor, and means governed by said electrical condition for limiting the application of said friction brake.

8. In a vehicle brake, the combination of a stator for producing a magnetic field, a rotor adapted to rotate in said field, means for effecting a friction braking effect on said rotor, means operable on actuation of said last named means for altering the electrical condition of said rotor, and means governed by said electrical condition for controlling the degree of said friction braking effect.

9. In a brake apparatus for a vehicle, the combination of a rotor adapted to rotate as the vehicle moves, means for producing a magnetic field coextensive with an annular portion of said rotor, and means for causing a unidirectional electric current to flow in said rotor when rotating in said field to effect retardation of the rotor.

10. In a brake apparatus for a vehicle, the combination of a rotor adapted to rotate as the vehicle moves, means for producing a magnetic field coextensive with an annular portion of said rotor, and resistance means adapted to be connected to said rotor for controlling electric current produced in said rotor by rotation in said field to vary the braking effect produced by said current.

11. In a brake apparatus for a vehicle, the combination of a rotor adapted to rotate as the vehicle moves, means for producing a magnetic field coextensive with an annular portion of said rotor, means for frictionally engaging said rotor to produce a friction braking effect, and means controlled by electric currents produced in said rotor when rotating in said field for controlling the producing of said friction braking effect.

12. In a combined electric and friction brake for a vehicle, the combination of a rotor adapted to be rotated by motion of said vehicle, means for producing a field of magnetic flux normal to and coextensive with an annular portion of said rotor, said flux being adapted to produce electrical currents in and flowing radially of said rotor when rotating in said flux, and friction means for engaging the periphery of said rotor to complete an electrical circuit exteriorly thereof for the flow of said current to produce an electric braking effect on said rotor.

13. In a combined electric and friction brake for a vehicle, the combination of a rotor adapted to be rotated by motion of said vehicle, means for producing a field of magnetic flux normal to and coextensive with an annular portion of said rotor, said flux being adapted to produce electrical currents in and flowing radially of said rotor when rotating in said flux, a friction brake band adapted to engage the periphery of said rotor to produce a braking effect thereon, means controlled by operation of said brake band for causing said currents in said rotor to produce an electrical braking effect, and means responsive to said currents for controlling the operation of said brake band.

14. In a combined electric and friction brake for a vehicle, the combination of a rotor adapted to be rotated by motion of said vehicle, means for producing a field of magnetic flux normal to and coextensive with an annular portion of said rotor, said flux being adapted to produce electrical currents in and flowing radially of said rotor when rotating in said flux, a friction brake means for engaging the periphery of said rotor to produce a braking effect thereon, said friction brake means having yielding contact making elements associated therewith also adapted to engage said rotor to complete a circuit thereto, and means whereby an operation of said friction brake means causes said contact elements to contact said rotor to complete an electrical circuit to said rotor to produce a braking effect thereon.

15. In a vehicle brake, an electric brake comprising a stator and a rotor, a friction brake comprising elements associated with said rotor and movable theretoward to produce a friction braking effect, means operable by a movement of said elements for applying said electrical brake, and means governed by said electrical brake for delaying the application of said friction brake.

16. In a vehicle brake, an electric brake comprising a stator and a rotor, a friction brake comprising elements associated with said rotor and movable theretoward to produce a friction braking effect, means operable by a movement of said elements for rendering said electric brake effective, and yielding electro-responsive means for limiting the degree of application of said friction brake when the electric brake is effective.

17. In a brake apparatus, the combination with means for producing a magnetic field, of a rotor adapted to rotate in said field and to have electric currents produced therein effective in producing a braking effect on said rotor, a friction brake element adapted to engage said rotor to produce a friction braking effect thereon, fluid pressure actuated means for urging said friction brake element into engagement with said rotor in accordance with the pressure of a fluid supplied thereto, and means responsive to the current in said rotor for causing said friction brake element to engage said rotor with a force less than that corresponding to the degree of fluid pressure supplied.

18. In a vehicle brake apparatus, the combination with means for producing a magnetic field, of a rotor adapted to rotate in said field and to have produced therein electric currents effective in producing a braking effect on said rotor, a friction brake element adapted to engage said rotor to produce a friction braking effect thereon, a brake cylinder, linkage mechanism connecting said brake cylinder to said friction brake element and adapted to actuate said friction brake element into engagement with said rotor when fluid under pressure is supplied to said brake cylinder, a circuit connected to said rotor and to said friction brake element, and an electrically actuated stop device connected in said circuit and adapted when energized to oppose actuation of said linkage mechanism by said brake cylinder.

19. In a vehicle brake apparatus, the combination with means for producing a magnetic field, of a rotor adapted to rotate in said field and to have currents produced therein effective in producing a braking effect on said rotor, a friction brake element adapted to engage said rotor to produce a friction braking effect thereon, yielding elements associated with said friction brake element and adapted to engage said rotor ahead of said friction brake elements, means for urging said friction brake element toward engagement with said rotor with a force in accordance with the degree of a fluid under pressure supplied thereto, and means rendered effective when said yielding elements engage said rotor for restraining movement of said friction brake element toward said rotor in accordance with the degree of current established in said rotor.

20. In a vehicle brake apparatus, the combination with means for producing a magnetic field, of a rotor adapted to rotate in said field and to have established therein currents effective in producing an electric braking effect on said rotor which diminishes as the speed of the vehicle diminishes, means for producing a friction brake effect on said rotor in accordance with the degree of pressure of a fluid supplied to produce a friction brake effect, means responsive to the degree of current in said rotor for limiting the degree of the friction braking effect produced according to the degree of electric braking effect produced, said last means being operative to permit said friction braking effect to increase as said electric braking effect decreases, the electric braking effect being greater at one time and the friction braking effect being greater at another time, and means for varying the degree of current strength to vary at what speed one braking effect becomes greater than the other.

21. In a vehicle brake apparatus, the combination with means for producing a magnetic field, of a rotor adapted to rotate in said field and to have electric currents established therein effective in producing an electric braking effect, a friction brake element adapted to engage said rotor to produce a friction braking effect thereon, means including a brake cylinder for actuating said friction brake element into engagement with said rotor, an electromagnetic device adapted to be connected to said rotor and having an element adapted to be urged in one direction with a force corresponding to the degree of current established in said rotor, said element being operative to oppose movement of said friction brake element toward said rotor, and means whereby as the current in said rotor diminishes said element yields to permit engagement of said friction brake element with said rotor with increasing force.

22. In a vehicle brake apparatus, the combination with means for producing a magnetic field, of a rotor adapted to rotate in said field and to have established therein currents effective in producing an electric braking effect, a friction brake element adapted to engage said rotor to produce a friction braking effect thereon, means for urging said friction brake element into engagement with said rotor, a normally deenergized electromagnetic device for opposing movement of said friction brake element toward said rotor, and means for energizing said electromagnetic device only after said friction brake element has lightly engaged said rotor and before an appreciable friction braking effect has been produced.

23. In a vehicle brake system, the combination with means for producing a plurality of magnetic fields of substantially equal strength, of rotors adapted to rotate in said magnetic fields, said rotors and fields being arranged such that currents are established in said rotors flowing radially thereof, means connecting the center portions of said rotors together, means adapted to engage the periphery of each of said rotors, and a circuit for connecting said last named means together, whereby an electrical circuit is formed between said rotors to permit the flow of current therebetween.

24. In a vehicle brake system, the combination with a stator having a plurality of pairs of annular pole pieces, the pole pieces of each pair being in opposing spaced relationship, of rotors adapted to rotate between said pairs of pole pieces, a winding on said stator adapted when energized to produce a magnetic flux between each of said pairs of pole pieces, means connecting the center portions of said rotors together, friction brake elements adapted to engage the periphery of each of said rotors, and a circuit connecting said elements, whereby an electric circuit is formed when said friction brake elements engage said rotors for the flow of current established in said rotors.

25. In a vehicle brake system, the combination with a stator having a plurality of pairs of annular pole pieces, the pole pieces of each pair being in opposing spaced relationship and defining an air gap therebetween, of rotors adapted to rotate in the air gap between said pole pieces, a winding on said stator adapted when energized to produce a magnetic flux across said air gaps, means connecting the center portions of said rotors together, friction brake elements adapted to engage the periphery of each of said rotors, a circuit connecting said elements, whereby a closed electric circuit is formed for the flow of current established in said rotors when rotating in said field, means for urging said friction brake elements into engagement with said rotors, and means responsive to the flow of current in said circuit for limiting the degree of force with which said elements engage said rotors.

26. In an electric brake device, the combination with a stator member having a pair of annular pole pieces in opposing spaced relationship, of a rotor adapted to rotate between said pole pieces, a winding on said stator adapted when energized to produce a magnetic flux between said pole pieces, an element adapted to be actuated into and out of engagement with the periphery of said rotor, and a circuit connected to said element and to said rotor, whereby when said rotor is rotating in said flux current flows in said circuit upon engagement of said element with said rotor.

27. In an electric brake device, the combination with a stator member having axially extending annular pole pieces in opposing spaced relationship and a winding disposed on said stator and adapted when energized to establish a flux between said pole pieces, of a disc-like rotor adapted to rotate between said pole pieces and to have produced therein currents flowing radially thereof, relatively stationary elements adapted to be actuated into and out of engagement with the periphery of said rotor, a circuit connected to said elements and to a center portion of said rotor for providing an external circuit for the flow of current in said rotor, and a resistance device in said circuit for regulating said current.

28. In a vehicle brake apparatus, the combination with a vehicle driving motor having a shaft, of means for producing a magnetic field, a rotor secured to said shaft and adapted to rotate in said field and to have established therein currents for producing an electric braking effect, a friction brake element adapted to engage the periphery of said rotor to produce a friction brake effect thereon, means for actuating said friction brake element into engagement with said rotor, a circuit connected to said friction brake element and to said rotor, and an electromagnetic device in said circuit adapted to be energized upon engagement of said friction brake element with said rotor and operable thereafter to limit the degree of force with which said friction brake element engages said rotor in accordance with the electric braking effect produced.

GEORGE W. BAUGHMAN.